(12) United States Patent
Yamauchi et al.

(10) Patent No.: US 8,721,085 B2
(45) Date of Patent: May 13, 2014

(54) IMAGE DISPLAY DEVICE

(75) Inventors: Taisuke Yamauchi, Matsumoto (JP); Masayuki Takagi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 274 days.

(21) Appl. No.: 12/953,667

(22) Filed: Nov. 24, 2010

(65) Prior Publication Data

US 2011/0141439 A1 Jun. 16, 2011

(30) Foreign Application Priority Data

Dec. 15, 2009 (JP) ................................. 2009-283963

(51) Int. Cl.
*G03B 21/00* (2006.01)
(52) U.S. Cl.
USPC ............................................ 353/31; 359/619
(58) Field of Classification Search
USPC ........................................ 353/28, 31; 359/619
See application file for complete search history.

(56) References Cited

U.S. PATENT DOCUMENTS

| | | | |
|---|---|---|---|
| 5,237,399 A | 8/1993 | Inada et al. | |
| 7,515,342 B2* | 4/2009 | Tanaka et al. | 359/619 |
| 2008/0192206 A1* | 8/2008 | Takagi | 353/28 |
| 2009/0040467 A1 | 2/2009 | Yamauchi et al. | |
| 2009/0066917 A1* | 3/2009 | Hsu et al. | 353/33 |
| 2009/0161033 A1 | 6/2009 | Kaise | |
| 2009/0174943 A1* | 7/2009 | Takagi et al. | 359/558 |
| 2009/0323030 A1* | 12/2009 | Hazama et al. | 353/38 |

FOREIGN PATENT DOCUMENTS

| | | |
|---|---|---|
| JP | H04-172436 A | 6/1992 |
| JP | 2007-286110 A | 11/2007 |
| JP | 2009-042372 | 2/2009 |
| JP | 2009-216843 A | 9/2009 |

* cited by examiner

*Primary Examiner* — Francis M Legasse, Jr.
*Assistant Examiner* — Jerry Brooks
(74) *Attorney, Agent, or Firm* — Maschoff Brennan

(57) ABSTRACT

An image display device includes: at least one illumination system adapted to emit a light beam; at least one light modulation element adapted to modulate the light beam emitted from the illumination system; and a projection optical system adapted to project the light beam modulated by the light modulation element, wherein a proceeding direction of a principal ray of the light beam modulated by the light modulation element is nonparallel to an optical axis of the projection optical system when the light beam modulated by the light modulation element enters the projection optical system.

6 Claims, 12 Drawing Sheets

IMAGE DISPLAY DEVICE

BACKGROUND

1. Technical Field

The present invention relates to an image display device.

2. Related Art

In the past, projectors have been known as image display devices capable of displaying large-screen images. As light sources for the projectors, laser sources are thought to be hopeful from the viewpoint that high contrast ratio, excellent color reproducibility, quick lighting, downsizing, longer life, and so on become achievable. Use of the laser source makes it possible to obtain a number of advantages described above on the one hand, but it also makes it easy for the speckle noise due to the coherent property of laser beams to occur on the other hand. If the speckle noise is viewed, the sensation of glare might be provided to the observer of the displayed image to thereby degrade the image quality in some cases.

As one of the methods capable of reducing the speckle noise, there can be cited a method of superimposing high-frequency noise on the speckle noise, for example, a method of widening the diffusion angle of the image light (reduction in F-number). In particular, it is preferable to widen the diffusion angle of the image light so that the light intensity in the Fourier transform plane of the projection optical system has a ring-like distribution having a peak around the light axis. By making the light intensity have the ring-like distribution, it becomes possible to increase the light contributing to the reduction of the speckle noise, and at the same time, to reduce the light covered by the projection optical system compared to the case of forming a broad distribution around the light axis. Thus, it becomes possible to effectively reduce the speckle noise, and at the same time, degradation of the light efficiency can also be prevented.

In order for widening the diffusion angle of the image light, it is sufficient to dispose the diffusion section at the position where the image light is focused into an image (see, e.g., JP-A-2009-42372 (Document 1)). In Document 1, a diffusion plate formed of a diffraction optical element such as a computer generated hologram (CGH) is disposed at the position where an intermediate image is formed in the projection optical system, and thus, the diffusion angle of the image light is widened by the diffusion plate.

According to the technology of Document 1, the speckle noise can effectively be reduced, but there arises a problem of growing in size of the projection optical system. As a method of widening the diffusion angle of the image light at a position other than the position where the intermediate image is formed, there can be cited a method of disposing the diffusion section in the vicinity of the image formation surface (e.g., a liquid crystal layer) in a light modulation element (e.g., a liquid crystal light valve).

According to this method, although the growing in size of the device can be avoided, the following problems might be caused. In order for assuring the good light efficiency in this method, it is required to incorporate the diffusion section capable of controlling the light intensity to have a desired distribution such as a CGH into the light modulation element. In order for making the pattern of the CGH correspond to the pixels, microfabrication becomes necessary, and therefore, the device cost of the light modulation element might rise, or the device configuration might be complicated. Further, if microlenses are disposed on the light entrance side of the light modulation element for the purpose of guiding the source light to the pixels, the diffusion section might fail to function accurately due to the disturbance of the wavefront caused by the microlenses. If the diffusion section becomes to fail to function accurately, it becomes unachievable to make the light intensity distribution of the image light have a desired pattern, and therefore, the light efficiency is degraded.

SUMMARY

An advantage of some aspects of the invention is to provide a projector capable of reducing the speckle noise with a simple configuration, and moreover, of preventing the degradation of the light efficiency.

In order for obtaining the advantage described above, the following configurations are adopted as some aspects of the invention.

An image display device according to an aspect of the invention includes at least one illumination system adapted to emit a light beam, at least one light modulation element adapted to modulate the light beam emitted from the illumination system, and a projection optical system adapted to project the light beam modulated by the light modulation element, wherein a proceeding direction of a principal ray of the light beam modulated by the light modulation element is nonparallel to an optical axis of the projection optical system when the light beam modulated by the light modulation element enters the projection optical system.

According to the configuration described above, since the proceeding direction of the principal ray of the light beam (hereinafter referred to as an image light beam) modulated by the light modulation element is set to be nonparallel to the optical axis of the projection optical system, the barycentric position of the light intensity is located distant from the optical axis of the projection optical system in the Fourier transform plane of the projection optical system. Therefore, since the high-frequency noise on the imaging surface increases, and the high-frequency noise is superimposed on the speckle noise on the imaging surface, the speckle noise can effectively be reduced. Therefore, the necessity of widening the diffusion angle of the image light beam in the projection optical system is reduced, and it becomes possible to simplify the configuration of the projection optical system. Further, since the necessity of widening the width of the diffusion angle of the image light in terms of reducing the speckle noise is reduced, the light beam the projection optical system fails to cover can be reduced, and therefore, the degradation of the light efficiency can be prevented.

The image display device according to the aspect of the invention can take the following aspects as representative aspects of the invention.

It is preferable that the proceeding direction of the light beam emitted from the illumination system is nonorthogonal to an arranging direction of a plurality of pixels of the light modulation element when the light beam emitted from the illumination system enters the light modulation element as an incident light beam.

According to the configuration described above, since the proceeding direction of the light beam emitted from the illumination system is set to be nonparallel to the arranging direction of the plurality of pixels of the light modulating element, the proceeding direction of the principal ray of the image light becomes nonorthogonal to the arranging direction of the plurality of pixels, and it becomes easy to make the proceeding direction of the principal ray of the image light beam nonparallel to the optical axis of the projection optical system. Further, since the necessity of controlling the diffusion angle of the image light beam by the light modulation element is reduced, it becomes possible to simplify the configuration of the light modulation element.

It is preferable to provide a lens array adapted to converge the light beam emitted from the illumination system to the plurality of pixels of the light modulation element.

According to this configuration, since the lens array converges the incident light beam to the plurality of pixels, the light beam entering outside the pixels can be reduced irrespective of the light beam entering in a direction nonorthogonal to the arranging direction of the pixels, the degradation of the light efficiency can be prevented.

It is preferable that one of the plurality of pixels of the light modulation element includes a plurality of modulation elements adapted to modulate the incident light beam independently of each other, and the illumination system includes a first light source and a second light source adapted to emit laser beams with wavelengths different from each other, and is arranged so that a light beam emitted from the first light source enters a first modulation element of the plurality of modulation elements of the pixel as the incident light beam, and a light beam emitted from the second light source enters a second modulation element of the plurality of modulation elements of the pixel as the incident light beam.

According to this configuration, since one of the plurality of pixels of the image is composed of the light beam (hereinafter referred to as a first colored light beam) emitted from the first light source and the light beam (hereinafter referred to as a second colored light beam) emitted from the second light source, and the wavelengths of the first and second colored light beams are different from each other, it becomes possible to display an image with a plurality of colors. Since the light modulation element modulates both of the first and second colored light beams, the number of light modulation elements for displaying the image with a plurality of colors can be reduced, and the configuration of the image display device can be simplified.

It is preferable that the lens array has a plurality of lens elements, one of the plurality of lens elements is disposed corresponding one-to-one to one of the plurality of pixels of the light modulation element, and a central position of one of the plurality of lens elements corresponding to one of the plurality of pixels is shifted toward an opposite direction to the proceeding direction of the light beam entering the one of the plurality of lens elements, in a condition of viewing the plurality of pixels in a planar manner, from a central positions of one of the plurality of modulation elements constituting the one of the plurality of pixels.

According to this configuration, since one of the plurality of lens elements is disposed so as to correspond one-to-one to one of the plurality of pixels, and the lens element is used commonly to the plurality of modulation elements constituting the pixel, the cost of the lens array can be reduced. Since the incident light beam is converged by the lens element so as to be fitted into the respective modulation elements constituting the pixel, the intensity of the light entering outside the modulation elements can be reduced, and thus the degradation of the light efficiency can be prevented.

It is preferable that the illumination system includes a first diffusion section adapted to diffuse the light beam emitted from the first light source, a second diffusion section adapted to diffuse the light beam emitted from the second light source, and a collimating lens adapted to collimate a light beam diffused by the first diffusion section and to collimate a light beam diffused by the second diffusion section, and the light beam diffused by the first diffusion section and the light beam diffused by the second diffusion section enter the light modulation element at incident angles different from each other as the incident light beam via the collimating lens.

According to this configuration, since the first and second colored light beams are diffused by the first and second diffusion sections, it becomes easy to make the spot sizes of the first and second colored light beams match the area where the plurality of pixels are arranged in the light modulation element. Since the first and second diffusion sections can be designed independently in accordance with the wavelengths of the first and second colored light beams, it becomes easy to provide desired characteristics to the first and second diffusion sections. Since the light beams diffused by the first and second diffusion sections are collimated by the collimating lens, the incident angle to the light modulation element can be aligned among the first colored light beams and can be aligned among the second colored light beams. Since the incident angle to the light modulation element is different between the first and second colored light beams, it becomes easy to make the first and second colored light beams separately enter the first and second modulation elements.

It is preferable that the light modulation element has a plurality of modulation elements adapted to modulate the incident light beam independently of each other, and one of the plurality of pixels of the light modulation element is composed of one of the plurality of modulation elements, the lens array has a plurality of lens elements, one the plurality of lens elements is disposed corresponding one-to-one to the one of the plurality of pixels of the light modulation element, and a central position of the one of the plurality of lens element corresponding to the one of the plurality of pixels is shifted toward an opposite direction to the proceeding direction of the light beam entering the one of the plurality of lens elements, in a condition of viewing the plurality of pixels in a planar manner, from a central position of one of the plurality of modulation elements constituting the one of the plurality of pixels.

According to this configuration, since the incident light beam is converged by the lens element so as to be fitted into the modulation elements constituting the pixel, the intensity of the light entering outside the modulation elements can be reduced, and thus the degradation of the light efficiency can be prevented.

It is preferable to provide a plurality of the illumination systems adapted to emit laser beams with wavelengths different from each other, a plurality of the light modulation elements composed of the light modulation elements provided so as to correspond one-to-one to the illumination systems, and a color combination element disposed on a light path between the plurality of the light modulation elements and the projection optical element, and adapted to combine light beams emitted from the plurality of light modulation elements.

According to this configuration, the image light beams having the wavelengths different from each other are combined by the color combination element, and then projected by the projection optical system, and thus the image with a plurality of colors can be displayed.

BRIEF DESCRIPTION OF THE DRAWINGS

The invention will be described with reference to the accompanying drawings, wherein like numbers reference like elements.

FIGS. 8A and 8B are diagrams showing a projector according to a second modified example, wherein FIG. 8A is a perspective view, and FIG. 8B is a configuration diagram.

DESCRIPTION OF EXEMPLARY EMBODIMENTS

Figure 1:
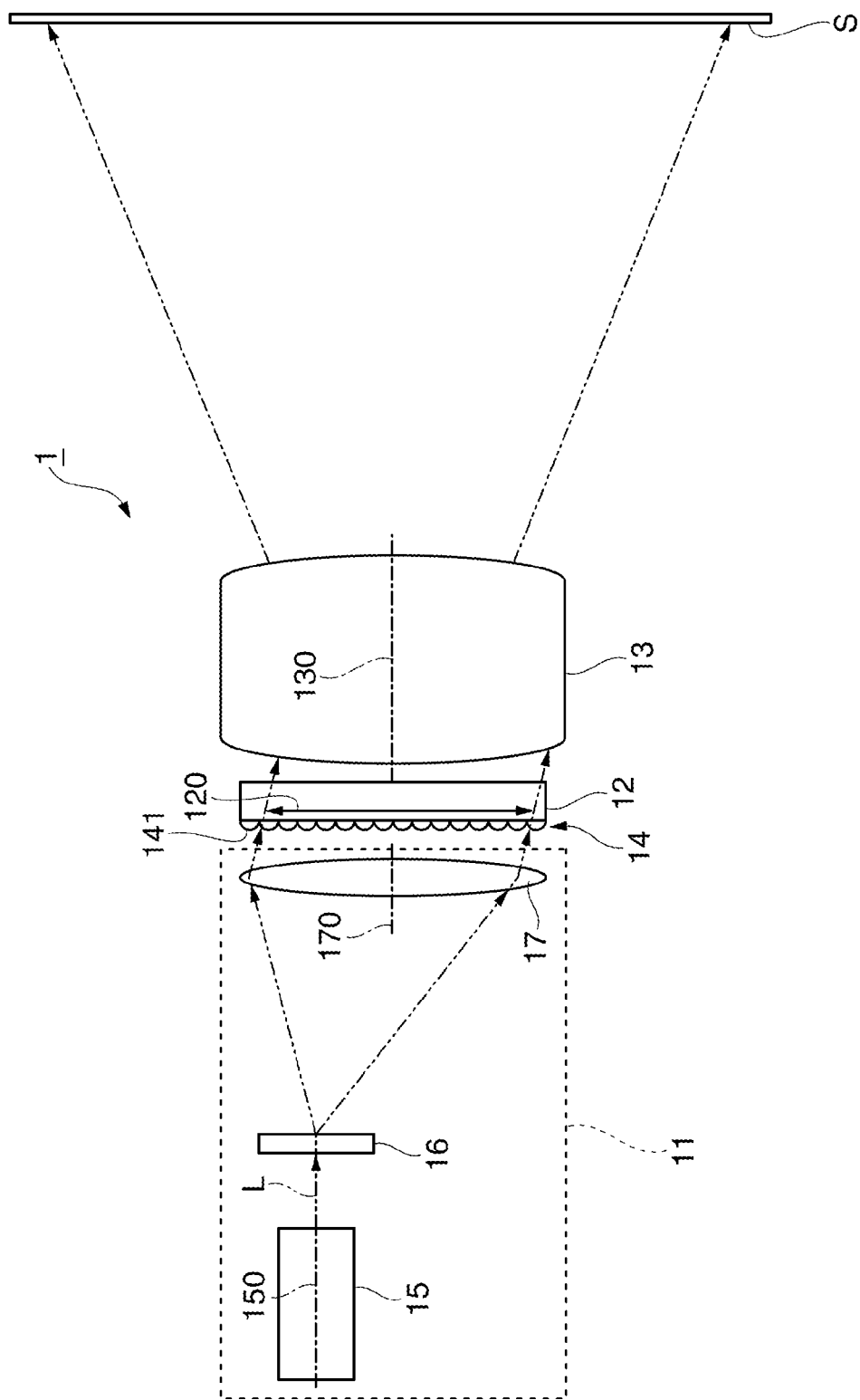
FIG. 1 is a diagram showing a projector according to a first embodiment of the invention.

Hereinafter, some embodiments of the invention will be explained with reference to the accompanying drawings. In the drawings used in the explanation, the sizes and the scales of the structures in the drawings might be made different from the actual structures in some cases in order for showing characteristic portions in an easy-to-understand manner. Further, the constituents substantially identical to each other in the embodiments are shown with the same reference numerals in the drawings, and the detailed explanation therefor might be omitted in some cases.

First Embodiment

FIG. 1 is a schematic diagram showing a schematic configuration of the projector 1 in the first embodiment. As shown in FIG. 1, the projector (an image display device) 1 is provided with an illumination system 11, a light modulation element 12, a projection optical system 13, and a lens array 14. The illumination system 11 has a light source 15, a diffusion section 16, and a collimating lens 17. The lens array 14 has a plurality of lens elements 141.

A general operation of the projector 1 is as follows. The light beam L emitted from the light source 15 is diffused by the diffusion section 16, and is then collimated by the collimating lens 17. The light beam L collimated by the collimating lens 17 is collected by each of the lens elements 141 of the lens array 14, and enters the light modulating element 12 while being separated so as to correspond to the respective pixels. The light beam L having entered the light modulation element 12 is modulated and controlled in each of the pixels to thereby form the light with grayscales corresponding to the pixels of the display image. The light beam L emitted from the light modulation element 12 enters the projection optical system 13, and is projected on the imaging surface S such as a screen in an enlarged manner, and thus the image is displayed by the light beam L imaged on the imaging surface S.

Then, the constituents of the projector 1 will be explained in detail.

The illumination system 11 is for illuminating the light modulation element 12 so that the proceeding direction of the principal ray becomes nonparallel to the optical axis 130 of the projection optical system 13 when the light beam L modulated by the light modulation element 12 enters the projection optical system 13. In the present embodiment, the optical axis 170 of the collimating lens 17 roughly coincides with the optical axis 130 of the projection optical system 13, and is roughly perpendicular to a light entrance area 120 of the light modulation element 12. The optical axis 150 of the light source 15 is arranged to be roughly parallel to the optical axis 170 of the collimating lens 17, but located differently therefrom.

The light source 15 is for emitting a coherent light beam such as a laser beam, and is composed of, for example, a laser diode. An external resonator or a wavelength conversion element is provided together with the laser diode of the light source 15 if necessary. For example, in the case of constituting the light source for emitting a green laser beam, a light source having a laser diode for emitting a red laser beam combined with the wavelength conversion element or the like is used.

The diffusion section 16 is for diffusing the light beam. The diffusion section 16 is composed of, for example, a diffusion plate formed of a light transmissive substrate having diffusing particles dispersed, a diffusion plate obtained by forming random irregularity on the surface of a light transmissive substrate, or a diffraction optical element such as a CGH. The diffusion section 16 of the present embodiment is composed of a diffraction optical element. The diffusion section 16 diffuses the light beam L so that the central axis of the light beam L becomes nonparallel to the optical axis 170 of the collimating lens 17. Further, the diffusion section 16 modulates the spot shape of the light beam L to have a similar shape (e.g., a roughly rectangular shape) to the light entrance area 120 of the light modulation element 12.

The collimating lens 17 is, for example, a field lens. Since the central axis of the light beam L entering the collimating lens 17 is arranged to be nonparallel to the optical axis 170, the light beam L having passed through the collimating lens 17 proceeds in a direction nonparallel to the optical axis 170. The light beam L emitted from the collimating lens 17 enters the lens array 14 from a direction nonparallel to the normal direction of the light entrance area 120 of the light modulation element 12. It should be noted that the collimating lens 17 can be disposed independently from the light modulation element 12, or can be disposed substantially integrally with the light modulation element 12 together with the lens array 14.

Figure 2A:
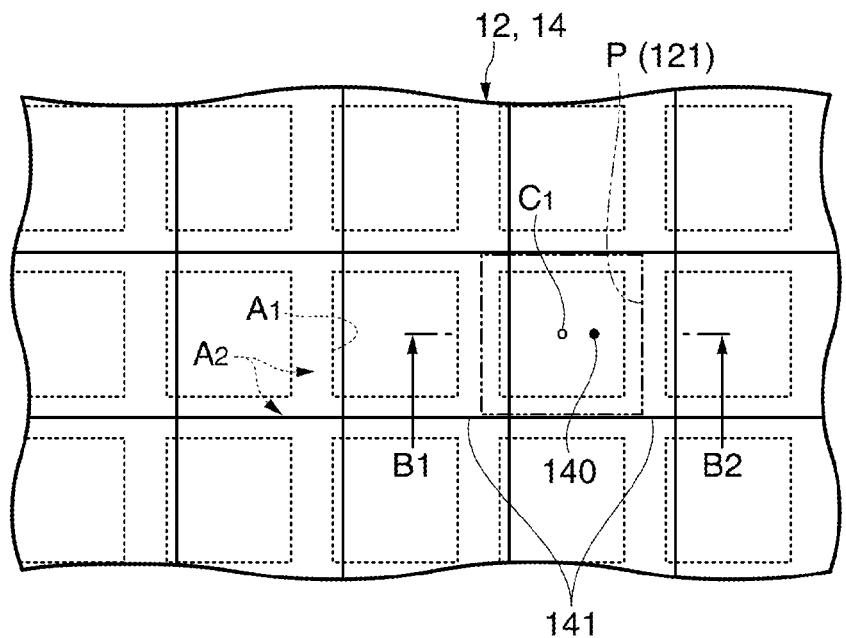
FIG. 2A is a plan view showing a lens array and a light modulation element.
Figure 2B:
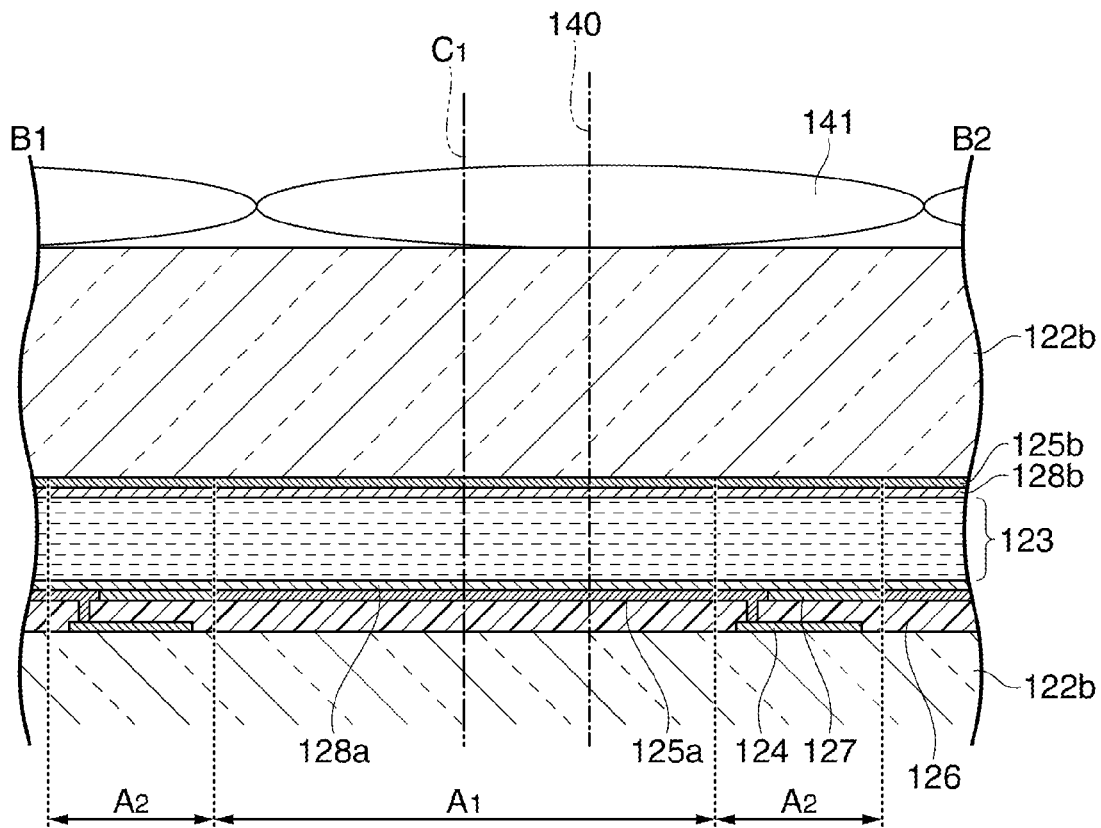
FIG. 2B is a cross-sectional view of the lens array and the light modulation element shown in FIG. 2A along the line indicated by the arrows B1, B2.

FIG. 2A is a plan view of the lens array 14 and the light modulation element 12 when viewing the light entrance area 120 of the light modulation element 12 in a planar manner, and FIG. 2B is a cross-sectional diagram of the lens array 14 and the light modulation element 12 viewed along the line indicated by the arrows B1, B2 shown in FIG. 2A. The light modulation element 12 of the present embodiment is composed of a transmissive liquid crystal light valve. As shown in FIG. 2A, the light modulation element 12 has a plurality of pixels P arranged two-dimensionally. The light entrance area 120 is formed as an area including roughly all of the arranged pixels P out of the planar area along the two arranging directions of the plurality of pixels P. In the present embodiment, the pixel P is composed of a single modulation element 121. The modulation element 121 has a pixel opening $A_1$ and a light blocking area $A_2$ surrounding the pixel opening $A_1$.

The lens array 14 has a plurality of lens elements 141. The lens element 141 has, for example, a rectangular planar shape, and is disposed so as to correspond one-to-one to the modulation element 121. The optical axis 140 of the lens element 141 is set to be located at the center of the lens element 141. In the condition of viewing the light entrance area 120 in a planar manner, the position of the optical axis 140 is shifted from the central position $C_1$ of the pixel opening $A_1$ in the opposite direction to the proceeding direction of the light beam entering the lens element 141. The amount of shift between the position of the optical axis 140 and the central position $C_1$ of the pixel opening $A_1$ is set in accordance with, for example, the incident angle of the light beam entering the lens element 141. The lens array 14 of the present embodiment is substantially integrated with the light modulation element 12. The lens array 14 can be disposed as a part of the illumination system 11, or can be disposed as a part of the light modulation element 12.

As shown in FIG. 2B, the light modulation element 12 has light transmissive substrates 122a, 122b, a liquid crystal layer 123, switching elements 124, light transmissive electrodes 125a, 125b, a planarizing layer 126, insulating sections 127, and oriented films 128a, 128b. The light transmissive substrates 122a, 122b are disposed so as to be opposed to each other, and the liquid crystal layer 123 is disposed in a space sandwiched between the light transmissive substrates 122a, 122b. The thickness direction of the liquid crystal layer 123 is set to a direction roughly parallel to the optical axis 140 of the lens element 141. The light entrance area 120 is set to be roughly parallel to the central plane in the thickness direction of the liquid crystal layer 123.

The switching element 124 is provided to every modulation element 121, and is disposed on the liquid crystal layer 123 side of the light transmissive substrate 122a. The switching element 124 switches the electrical signal supplied to the light transmissive electrode 125a. The light blocking section not shown is provided to the switching element 124 so as to cover the light entrance side thereof. The light blocking section is disposed on the periphery of the modulation element 121, and the area overlapping the light blocking section in the condition of viewing the light entrance area 120 in a planar manner corresponds to the light blocking area $A_2$.

The planarizing layer 126 is disposed so as to cover the switching elements 124. The light transmissive electrodes 125a are, for example, pixel electrodes, and disposed on the liquid crystal layer 123 side of the planarizing layer 126. The light transmissive electrodes 125a are disposed independently to the respective modulation elements 121 like, for example, islands. The insulating sections 127 are each disposed so as to separate the light transmissive electrodes 125a adjacent to each other, and are disposed on the liquid crystal layer 123 side of the planarizing layer 126. A part of each of the light transmissive electrodes 125a penetrates the planarizing layer 126, and is electrically connected to the switching element 124. The oriented film 128a is disposed on the liquid crystal layer 123 side of the light transmissive electrodes 125a and the insulating sections 127.

The light transmissive electrode 125b is provided in common to the plurality of modulation elements 121, and is disposed on the liquid crystal layer 123 side of the light transmissive substrate 122b. The oriented film 128b is disposed on the liquid crystal layer 123 side of the light transmissive electrode 125b. The light transmissive substrates 122a, 122b are each provided with a polarization plate not shown on the opposite side to the liquid crystal layer 123.

Figure 3A:
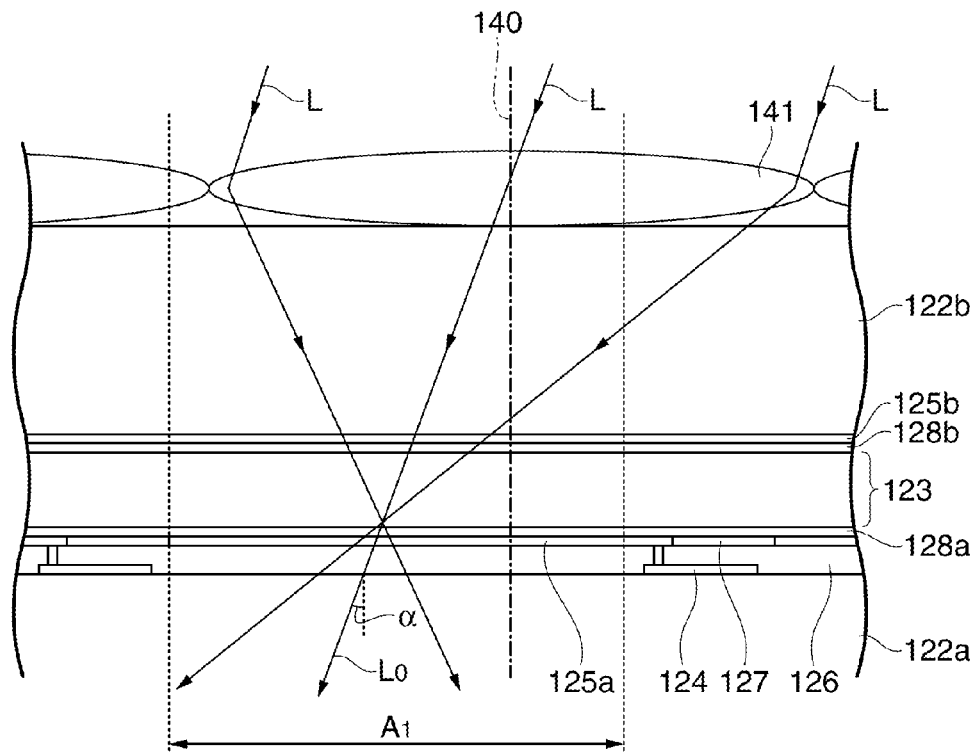
FIG. 3A is a diagram showing a light beam passing through the lens array and the light modulation element.

FIG. 3A is an explanatory diagram showing the light beam passing through the lens array 14 and the light modulation element 12. As shown in FIG. 3A, the proceeding direction of the light beam entering the lens array 14 is set to be nonparallel to the optical axis 140 of the lens element 141. The light beam L having entered the lens array 14 is collected by each of the lens elements 141. The lens elements 141 of the present embodiment each deflect the light beam L so that the approximately entire light beam L entering each of the lens elements 141 fits into the pixel opening $A_1$ in the liquid crystal layer 123. Here, it is arranged that the light beam L passing through each of the lens elements 141 makes the focus in the vicinity of the light exit end of the liquid crystal layer 123 at the central position $C_1$ of the pixel opening $A_1$. The incident angle of the light beam L with respect to the lens element 141, and the curvature factor and the refractive index of the lens element 141 are set so that the light beam L passing through the liquid crystal layer 123 can be switched taking the variation in the amount of modulation due to the difference in optical path length inside the modulation element 121 and so on into consideration. The proceeding direction of the principal ray $L_0$ having passed through the center of the lens element 141 forms an angle $\alpha°$ with the thickness direction of the liquid crystal layer 123. The angle $\alpha°$ is in a range of about 3° through 7°, for example.

Figure 3B:
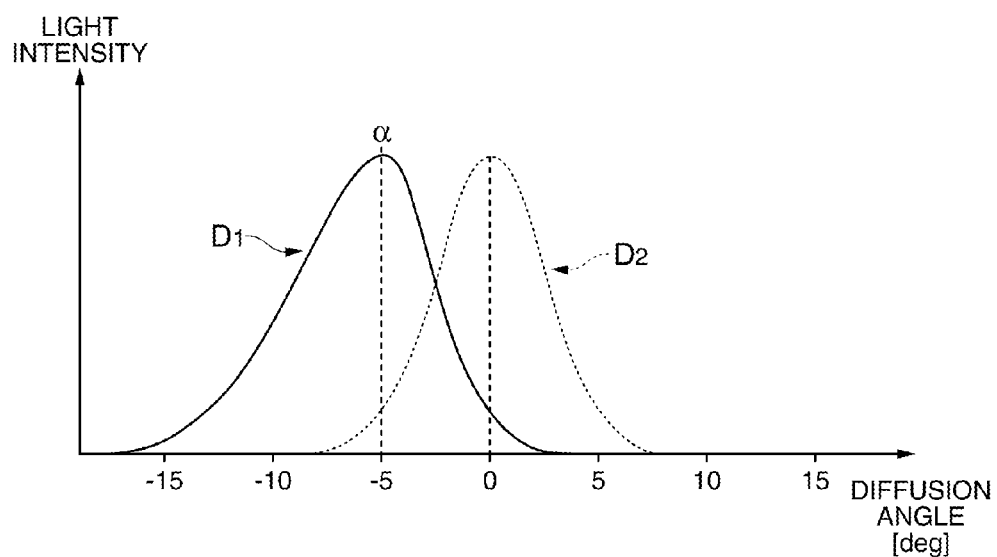
FIG. 3B is a graph showing the light intensity with respect to the diffusion angle of the light beam emitted from the light modulation element.

FIG. 3B is a graph showing a distribution $D_1$ of the light intensity with respect to the diffusion angle of the light beam L emitted from the light modulation element 12. In the graph shown in FIG. 3B, the lateral axis represents the diffusion angle assuming that the normal direction of the center plane in the thickness direction of the liquid crystal layer 123 is 0°, and the vertical axis represents the light intensity normalized by the maximum value of the light intensity. The graph of FIG. 3B also shows an example of the distribution $D_2$ of the light beam emitted from the light modulation element in a conventional projector for comparison. The distribution $D_2$ corresponds to the distribution of the light intensity with respect to the diffusion angle of the light beam emitted from the light modulation element when inputting the light beam from the normal direction of the light entrance area of the light modulation element. The distribution $D_2$ is typically a Gaussian distribution.

As shown in FIG. 3B, the light intensity in the distribution $D_1$ has a peak at the diffusion angle (the angle $\alpha$) corresponding to the proceeding direction of the principal ray $L_0$. In comparison between the distributions $D_1$, $D_2$, the distribution range of the light intensity, namely the width of the diffusion angle is in the same level between the distribution $D_1$ and the distribution $D_2$. In the area of the diffusion angle having an absolute value a certain amount distant from the angle 0°, the light intensity in the distribution $D_1$ is higher than that in the distribution $D_2$.

Figure 4:
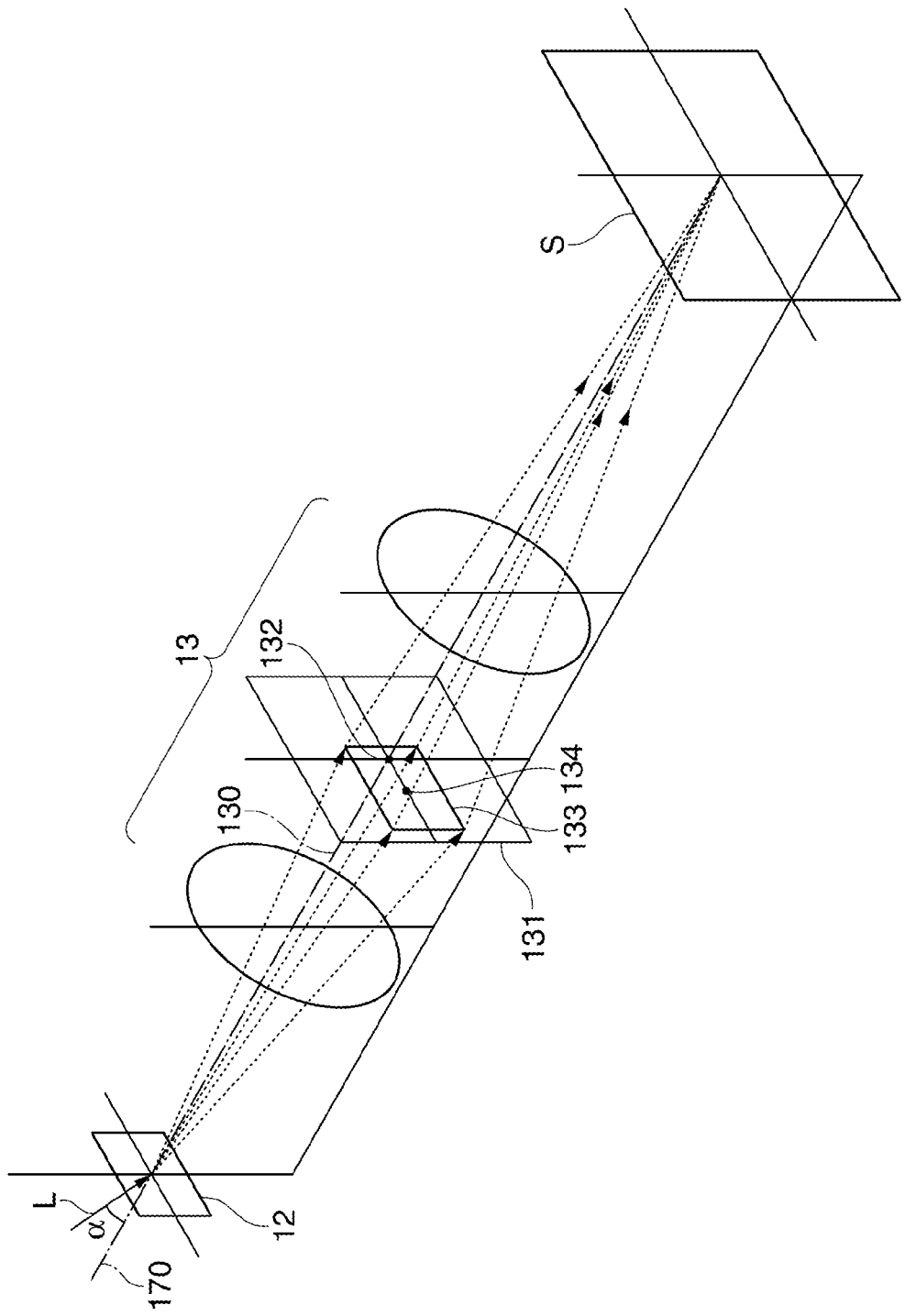
FIG. 4 is an explanatory diagram showing the mechanism of reducing the speckle noise.

FIG. 4 is an explanatory diagram showing the mechanism of reducing the speckle noise. Since the light beam L enters the light modulation element 12 from a direction nonparallel to the normal direction of the light entrance area 120, the light beam L emitted from the light modulation element 12 proceeds in a direction nonparallel to the optical axis 130 of the projection optical system 13. Thus, the spot 133 of the light beam L on the Fourier transform plane 131 of the projection optical system 13 is formed in an area shifted from the position 132 where the Fourier transform plane 131 and the optical axis 130 intersect with each other. The distance between the barycentric position 134 of the light intensity of the spot 133 and the position 132 corresponds to the angle $\alpha$.

In contrast thereto, the light beam having the distribution $D_2$ described above forms a spot having the barycenter of the light intensity at the position overlapping the optical axis on the Fourier transform plane. In other words, compared to the case in which the principal ray of the light beam emitted from the light modulation element roughly coincides with the optical axis of the projection optical system, in the present embodiment the intensity of the light beam passing through a position distant from the optical axis 130 of the projection optical system 13 in the Fourier transform plane 131 increases. In other words, a high frequency component in the Fourier transform plane 131 increases.

The light beam L emitted from one of the modulation element 121 of the light modulation element 12 is imaged on the imaging surface S through the spot 133, and forms a light beam representing one pixel of the image. The light beams emitted from the respective modulation elements 121 are respectively imaged on the imaging surface S, and thus the entire image is displayed. In the case of displaying the image with the light beam having a coherent property such as a laser beam, the speckle noise is normally apt to occur in the displayed image.

According to the projector 1 of the present embodiment, since the speckle noise is superimposed on the high-frequency noise due to the high-frequency component in the Fourier transform plane 131, the speckle noise can be reduced. In particular, since the high-frequency component is increased as described above, the speckle noise can dramatically be reduced. Therefore, the chance of providing the observer of the image with the sensation of glare due to the speckle noise is reduced, and therefore, the projector 1 capable of displaying a high-quality image is obtained.

Incidentally, as a method of reducing the speckle noise, there is known a method of disposing a diffusion member at the intermediate image formation position in the projection optical system. This is because, since the information of the diffusion angle of the light beam of each of the pixels is approximately concentrated at the intermediate image formation position, it is easy to control the diffusion angle of each of the pixels. In terms of widening the diffusion angle at the position where the image light beam is imaged, it is also possible to adopt the method of disposing a diffusion member in the vicinity of the part where the image is formed in the light modulation element.

In the present embodiment, the speckle noise is reduced by making the proceeding direction of the light beam L emitted from the light modulation element 12 nonparallel to the optical axis 130 of the projection optical system 13. Therefore, the necessity of widening the diffusion angle in the projection optical system 13 in terms of reducing the speckle noise is reduced, and thus, the configuration of the projection optical system 13 can be simplified.

Further, in the present embodiment, the incident angle of the light beam L emitted from the illumination system 11 to the light modulation element 12 is controlled to thereby control the proceeding direction of the light beam L emitted from the light modulation element 12. Therefore, the necessity of widening the diffusion angle in the vicinity of the part where the image is formed in the light modulation element 12 in terms of reducing the speckle noise is reduced, and thus, the configuration of the light modulation element 12 can be simplified.

Further, the barycentric position 134 of the spot 133 in the Fourier transform plane 131 is shifted from the optical axis 130 of the projection optical system 13, thereby increasing the high-frequency noise. Therefore, the high-frequency noise can be increased while hardly increasing the light beam, which the projection optical system fails to cover, compared to the method of widening the diffusion angle around the optical axis of the projection optical system, and thus it becomes possible to reduce the speckle noise while preventing the degradation of the light efficiency.

Figure 5:
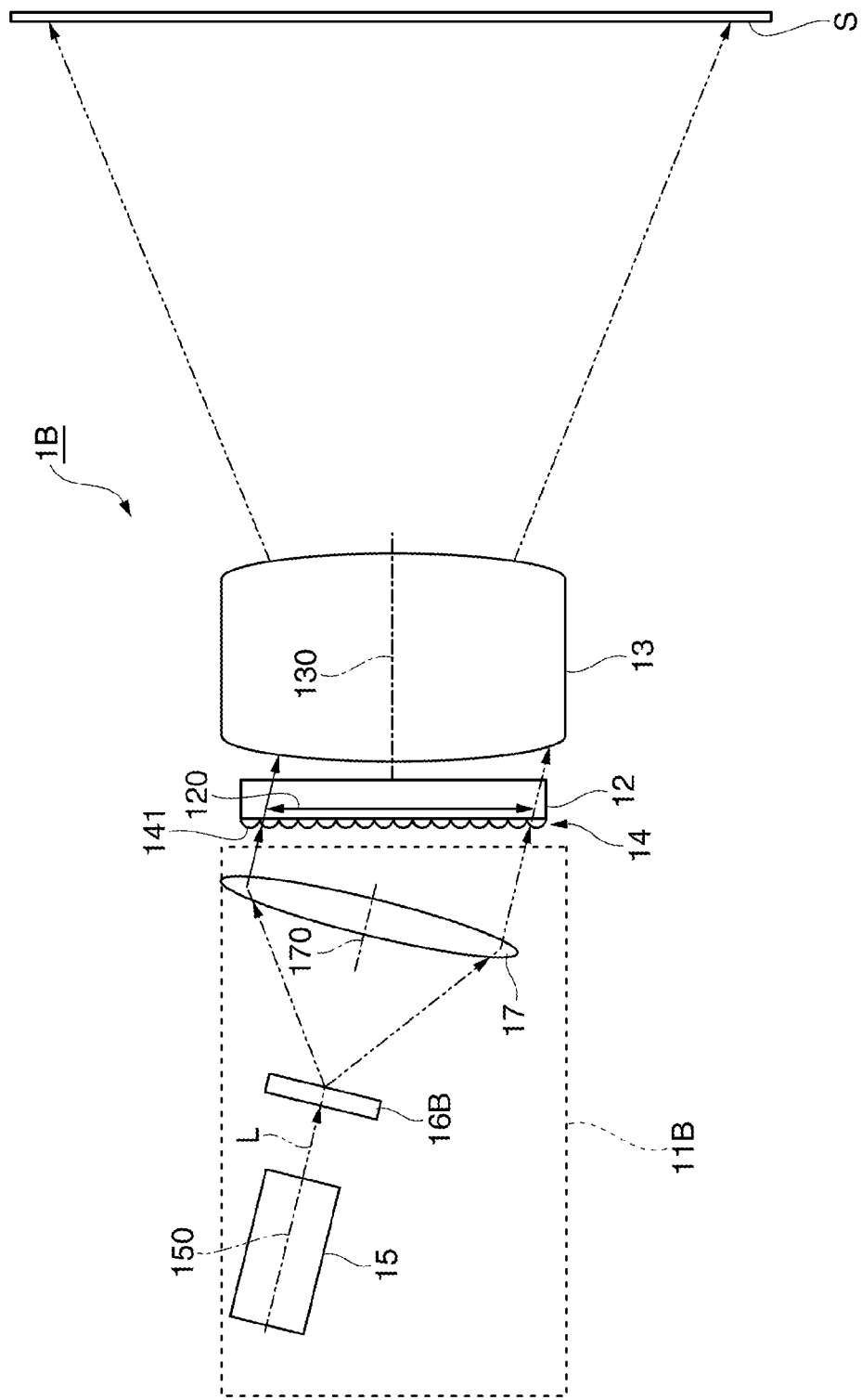
FIG. 5 is a diagram showing a projector according to a first modified example.

It should be noted that although in the first embodiment it is arranged that the optical axis 170 of the collimating lens 17 is roughly parallel to the normal direction of the light entrance area 120 of the light modulation element 12, the configuration of a first modified example shown in FIG. 5, for example, is also possible. The projector 1B of the first modified example is different from that of the first embodiment in the positional relationship between the constituents of the illumination system 11B, and the characteristics of the diffusion section 16B.

In the illumination system 11B, it is arranged that the optical axis 170 of the collimating lens 17 is nonparallel to the normal direction of the light entrance area 120 of the light modulation element 12. The optical axis 150 of the light source 15 is arranged to roughly coincide with the optical axis 170 of the collimating lens 17. The diffusion section 16B is arranged to widen the diffusion angle of the light beam L emitted from the light source 15 in an axisymmetrical manner with respect to the optical axis 150 of the light source 15.

Here, the constituents of the illumination system 11B are attached to the position fixing member or the like to thereby be substantially integrated with each other, and it is arranged that the posture of the illumination system 11B with respect to the light modulation element 12 can variably be controlled. Thus, the incident angle of the light beam L entering the light modulation element 12 can variably be controlled, and the extent to which the speckle noise is reduced can variably be controlled.

Second Embodiment

Then, a projector according to a second embodiment will be explained. The projector of the second embodiment is different from the projector of the first embodiment in that the illumination system is configured including a plurality of light sources for emitting respective colored light beams having wavelengths different from each other, and that a single plate projector for modulating the plurality of colored light beams emitted from the illumination system with a single light modulation element to thereby display an image is provided.

Figure 6:
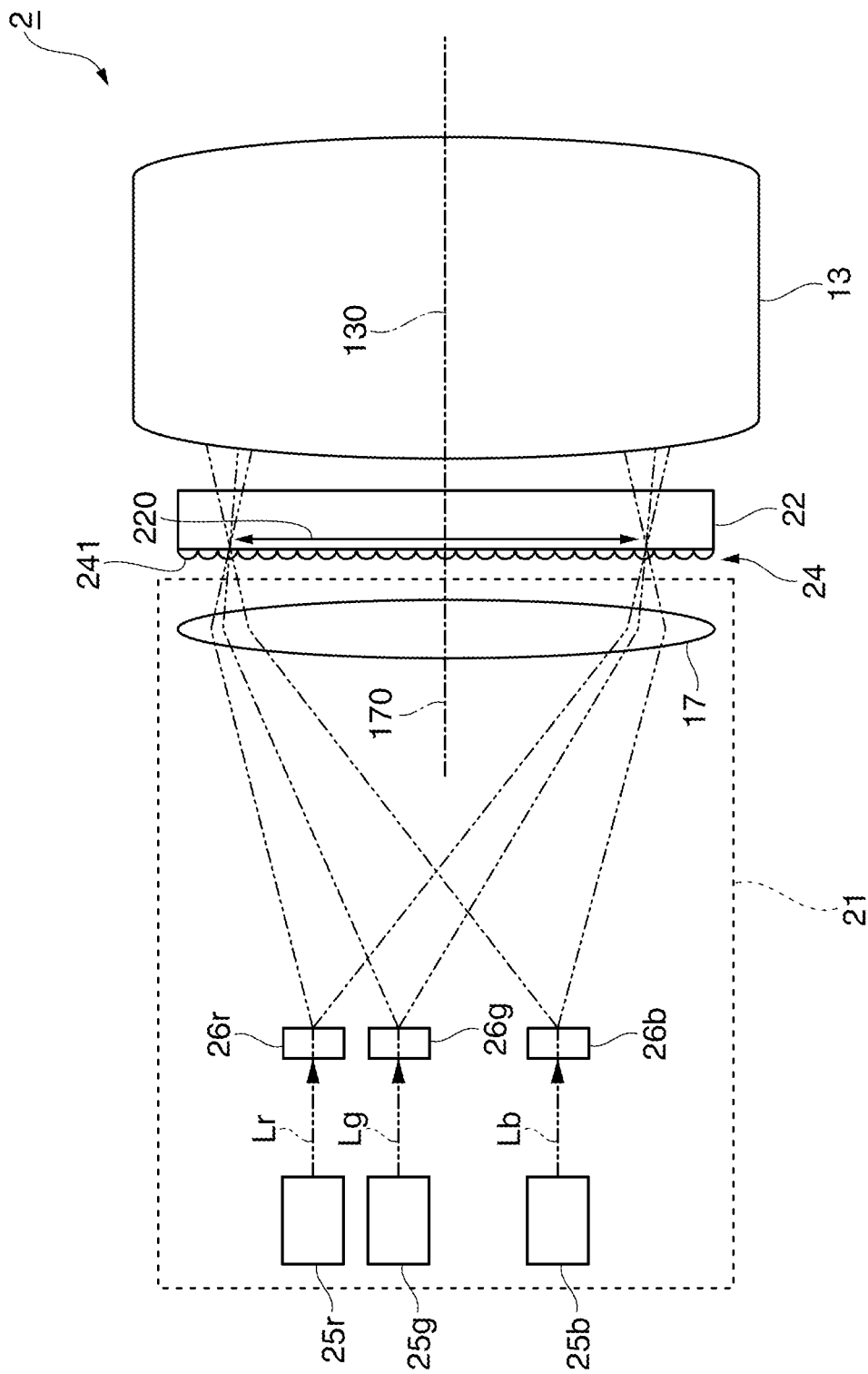
FIG. 6 is a configuration diagram showing a projector according to a second embodiment of the invention.
Figure 7A:
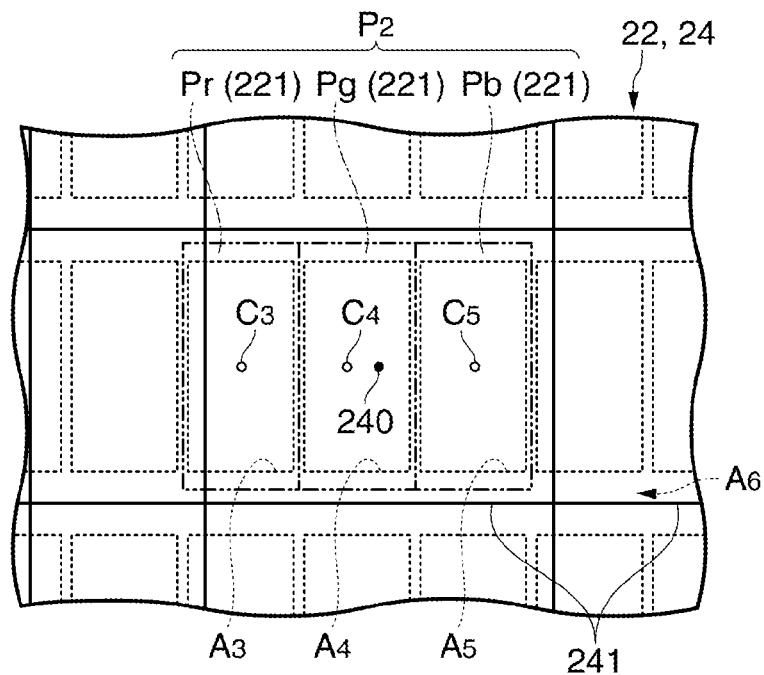
FIG. 7A is a plan view of a lens array and a light modulation element.
Figure 7B:
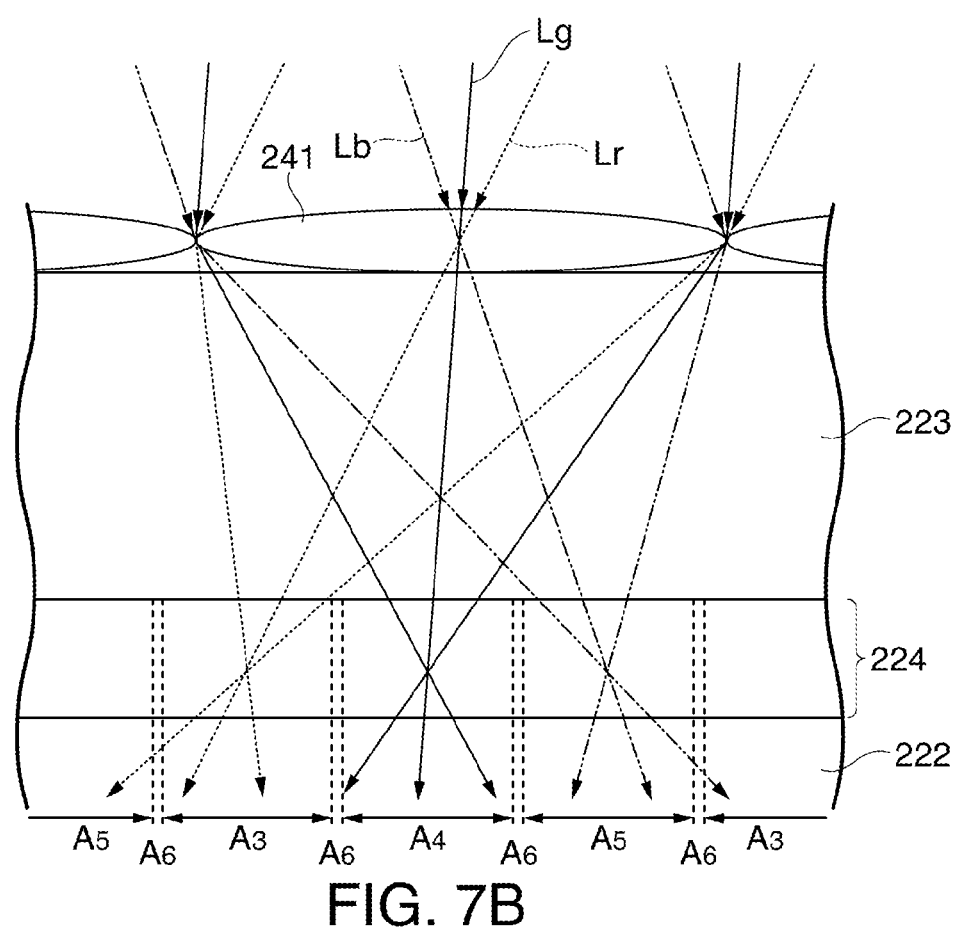
FIG. 7B is an explanatory diagram showing a light beam passing through the lens array and the light modulation element.

FIG. 6 is a schematic diagram showing the projector 2 according to the second embodiment, FIG. 7A is a plan view of a lens array 24 and a light modulation section 22 when viewing a light entrance area 220 in a planar manner, and FIG. 7B is an explanatory diagram showing a light beam passing through the lens array 24 and the light modulation element 22.

As shown in FIG. 6, the projector 2 is provided with an illumination system 21, the light modulation element 22, the projection optical system 13, and the lens array 24. The illumination system 21 has first through third light sources 25r, 25g, and 25b (hereinafter collectively referred to as a plurality of light sources 25), first through third diffusion sections 26r, 26g, and 26b (hereinafter collectively referred to as a plurality of diffusion sections 26), and the collimating lens 17.

A general operation of the projector 2 is as follows. The light beams emitted from the plurality of light sources 25 are diffused by the plurality of diffusion sections 26, and are then collimated by the collimating lens 17. The light beams collimated by the collimating lens 17 are input to and then collected by the lens array 24, and then enter the respective modulation elements of the light modulation element 22 separately. The light beams modulated by the light modulation element 22 are projected to the imaging surface S by the projection optical system 13, and then the image is displayed by the light beams thus imaged on the imaging surface S.

The plurality of light sources 25 each emits the light beam having a coherent property such as a laser beam, and the wavelengths of the light beams emitted are different from each other. In the present embodiment, it is arranged that the first light source 25r emits a red light beam. Lr, the second light source 25g emits a green light beam Lg, and the third light source 25b emits a blue light beam Lb. The first light source 25r and the second light source 25g are disposed in one of the areas located on both sides of the optical axis 170 of the collimating lens 17, and the third light source 25b is disposed in the other of the areas.

The light beam Lr emitted from the first light source 25r is input to and diffused by the first diffusion section 26r. Similarly, the light beam Lg emitted from the second light source 25g is input to and diffused by the second diffusion section 26g, and the light beam Lb emitted from the third light source 25b is input to and diffused by the third diffusion section 26b. The plurality of diffusion sections 26 is each composed of a diffraction optical element such as a CGH, but is designed to have characteristics different from each other so as to correspond to the wavelengths of the respective light beams input thereto.

In other words, the extent of the diffusion and the orientation of the central axis of the diffused beam by the plurality of diffusion sections 26 are adjusted so that the proceeding directions of the light beams Lr, Lg, and Lb having been diffused and then passed through the collimating lens 17 form angles different from each other with the light entrance area 220 of the light modulation element 22. Here, the characteristics of the plurality of diffusion sections are adjusted so that the light beams Lr, Lg, and Lb having passed through the collimating lens 17 enter substantially the same area in the light modulation element 12.

As shown in FIGS. 7A and 7B, the light modulation element 22 has a plurality of pixels $P_2$ arranged two-dimensionally. Each of the pixels $P_2$ is composed of three subpixels Pr, Pb, and Pg. Each of the subpixels Pr, Pg, and Pb is composed of one modulation element 221. In other words, each of the pixels $P_2$ is composed of the three modulation elements 221. The configuration of the modulation element 221 is substantially the same as that of the first embodiment. The subpixel Pr has a pixel opening $A_3$, the subpixel Pg has a pixel opening $A_4$, and the subpixel Pb has a pixel opening $A_5$. A light blocking area $A_6$ is formed so as to surround the pixel openings $A_3$ through $A_5$.

The lens array 24 has a plurality of lens elements 241. The lens element 241 is disposed so as to correspond one-to-one to the pixel $P_2$. The optical axis 240 of the lens element 241 is set to be located at the center of the lens element 241. The position of the optical axis 240 is shifted toward the opposite direction to the proceeding direction of the light beam entering the lens element 241 with respect to either of the central position $C_3$ of the pixel opening $A_3$, the central position $C_4$ of the pixel opening $A_4$, and the central position $C_5$ of the pixel opening $A_5$ in the condition of viewing the light entrance area 220 in a planar manner.

The light modulation element 22 has a first substrate 222, a second substrate 223, and a liquid crystal layer 224. Although the detailed configuration of the first and second substrates 222, 223 is not shown in the drawings, the first substrate 222 is composed of the light transmissive substrate 122a, the switching elements 124, the light transmissive electrodes 125a, the planarizing layer 126, the insulating sections 127, the oriented film 128a, and so on explained in the first embodiment. The second substrate 223 is composed of the light transmissive substrate 122b, the light transmissive electrode 125b, the oriented film 128b, and so on. The liquid crystal layer 224 is disposed in a space sandwiched between the first and second substrates 222, 223. The thickness direction of the liquid crystal layer 224 is set to a direction roughly parallel to the optical axis 240 of the lens element 241. The light entrance area 220 is set to be roughly parallel to the central plane in the thickness direction of the liquid crystal layer 224.

The proceeding directions of the light beams Lr, Lg, and Lb entering the lens array 24 are different from each other, and are all set to be nonparallel to the optical axis 240 of the lens element 241. The light beams Lr, Lg, and Lb having entered the lens array 24 are collected by each of the lens elements 241. The lens element 241 refracts the light beam Lr so that the light beam Lr fits into the pixel opening $A_3$ of the subpixel Pr in the liquid crystal layer 224. Similarly, the lens element 241 refracts the light beams Lg, Lb so that the light beams Lg, Lb fit into the pixel openings $A_4$, $A_5$ of the subpixels Pg, Pb in the liquid crystal layer 224, respectively. As described above, it is arranged that among the light beams Lr, Lg, and Lb, only the light beam Lr enters the subpixel Pr, only the light beam Lg enters the subpixel Pg, and only the light beam Lb enters the subpixel Pb.

The light beams Lr, Lg, and Lb are modulated and controlled in the respective subpixels Pr, Pg, and Pb independently of each other in the liquid crystal layer 224, and then emitted from the light modulation element 22. The proceeding direction of the principal ray of each of the light beams Lr, Lg, and Lb emitted from the light modulation element 22 is arranged to be nonparallel to the incident light axis out of the optical axes 130 of the projection optical system 13. The light beams Lr, Lg, and Lb emitted from the light modulation element 22 are imaged on the imaging surface via the projection optical system 13. The light beams Lr, Lg, and Lb emitted from the subpixels Pr, Pg, and Pb included in one pixel $P_2$ are imaged on the imaging surface to form a light beam representing one pixel of a full-color image.

In the projector 1 according to the second embodiment, the proceeding directions of the light beams Lr, Lg, and Lb emitted from the light modulation element 22 are all arranged to be nonparallel to the optical axis 130 of the projection optical system 13. Therefore, on the same ground as explained in the first embodiment, the high-frequency noise is superimposed on the speckle noise in each of the light beams Lr, Lg, and Lb, and thus the speckle noise can be reduced. Further, the light beam the projection optical system 13 fails to cover can be reduced, and thus the degradation of the light efficiency can be prevented.

Further, since the image is displayed using the light beams Lr, Lg, and Lb having the wavelengths different from each other, a full-color image can be displayed. Since the light beams Lr, Lg, and Lb with a plurality of wavelengths are modulated by a single light modulation element 22, the number of light modulation elements can be reduced, and the device configuration of the projector 2 can be simplified.

It should be noted that although the three light sources emitting the light beams with the wavelengths different from each other are used in the second embodiment, the number of light sources can be two or more than three, and in the case of using three or more light sources, light sources emitting the light beams with substantially the same wavelengths can be included. Hereinafter, the configuration having four light sources will be explained.

Figure 8A:
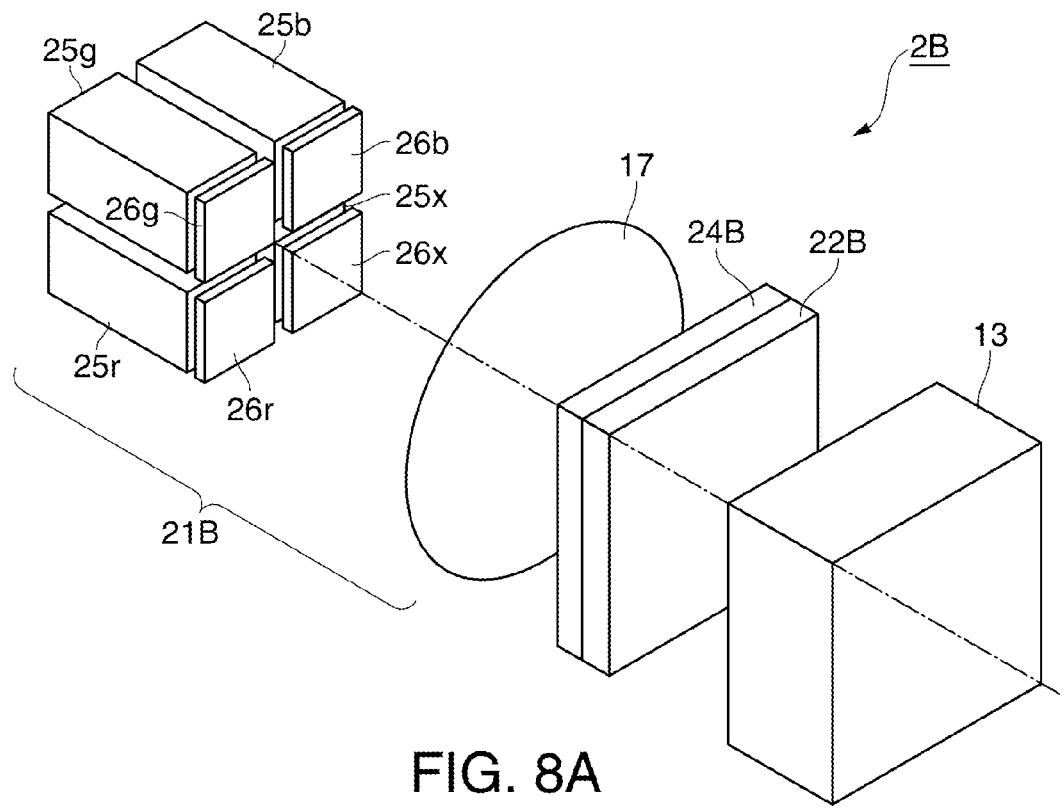
Figure 8B:
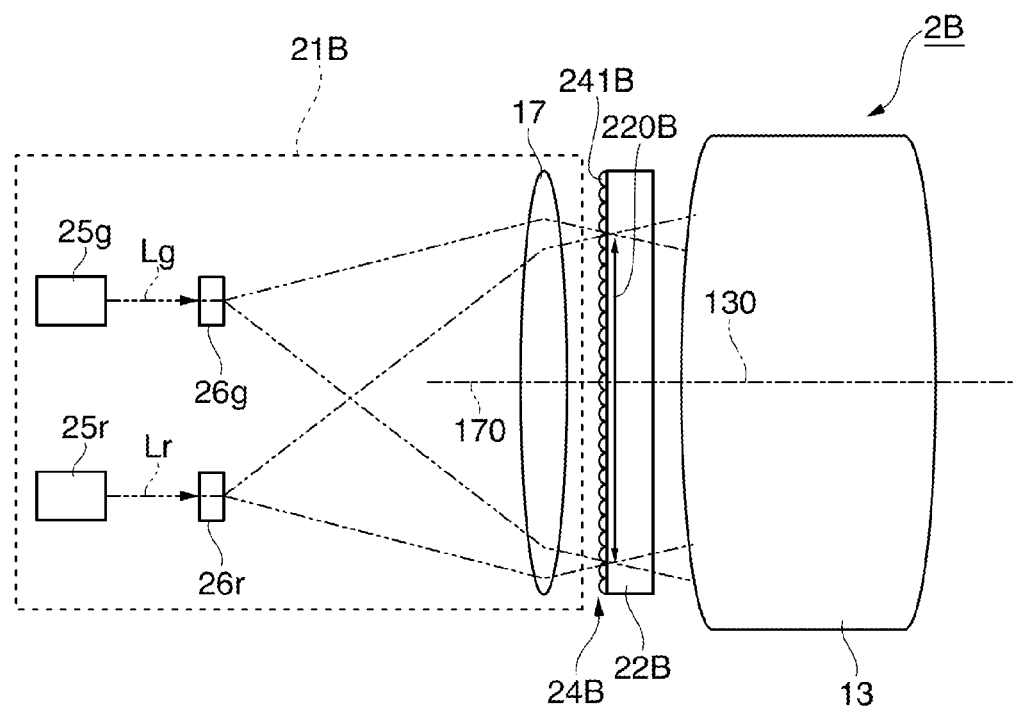

FIG. 8A is a schematic perspective view showing a projector 2B according to a second modified example, and FIG. 8B is a plan view of the projector 2B when viewing a plane including the optical axis 130 from one of the arranging directions of the light sources in a planar manner.

As shown in FIG. 8A, the projector 2B is provided with an illumination system 21B, a light modulation element 22B, the projection optical system 13, and a lens array 24B. The illumination system 21B has a plurality of light sources 25r, 25g, 25b, and 25x (hereinafter collectively referred to as a plurality of light sources 25B), first through fourth diffusion sections 26r, 26g, 26b, and 26x (hereinafter collectively referred to as a plurality of diffusion sections 26B), and the collimating lens 17.

The optical axis 170 of the collimating lens 17 roughly coincides with the normal direction of the light entrance area 220B and the optical axis 130 of the projection optical system 13. The plurality of light sources 25B is arranged two-dimensionally in two directions along the light entrance area 220B of the light modulation element 22B. Here, the plurality of light sources 25B is disposed symmetrically around the optical axis 170 of the collimating lens 17. The optical axes of the plurality of light sources 25B are all arranged to be parallel to the optical axis 170 of the collimating lens 17, but located differently therefrom.

The first through third light sources 25r, 25g, and 25b, and the first through third diffusion sections 26r, 26g, and 26b are substantially the same as those of the second embodiment. The fourth light source 25x can be one emitting a light beam with a wavelength the same as that of either one of the first through third light sources, or can be one emitting a light beam with a wavelength different from that of any of the light beams. The fourth diffusion section 26x is for diffusing the light beam emitted from the fourth light source 25x. Similarly to one explained in the second embodiment, the fourth diffusion section 26x has a characteristic adjusted in accordance with the wavelength of the light beam emitted from the fourth light source 25x.

As shown in FIG. 8B, the light beam Lr emitted from the first light source 25r is input to and diffused by the first diffusion section 26r, and is then collimated by the collimating lens 17. The light beam Lr having passed through the collimating lens 17 is input to and then collected by the lens array 24B, and then enters the light modulation element 22B. Similarly, the light beam Lg emitted from the second light source 25g is diffused by the second diffusion section 26g, then collimated by the collimating lens 17, then collected by the lens array 24B, and then enters the light modulation element 22B. The proceeding directions of the light beams Lr, Lg having passed through the collimating lens 17 are different from each other, and are all set to be nonparallel to the normal direction of the light entrance area 220B of the light modulation element 22B.

It should be noted that although FIG. 8B shows the light beams Lr, Lg emitted from the first light sources 25r and the second light source 25g, the light beams Lr, Lg are disposed on both sides opposite to each other of the optical axis 170 of the collimating lens 17 with respect to the first light source 25r and the second light source 25g. The same is applied to the light beams emitted from the third light source 25b and the fourth light source 25x. In other words, the proceeding directions of the light beams having been emitted from the plurality of light sources 25B and passed through the collimating lens 17 are different from each other, and are set to be nonparallel to the normal direction of the light entrance area 220B of the light modulation element 22B.

Figure 9A:
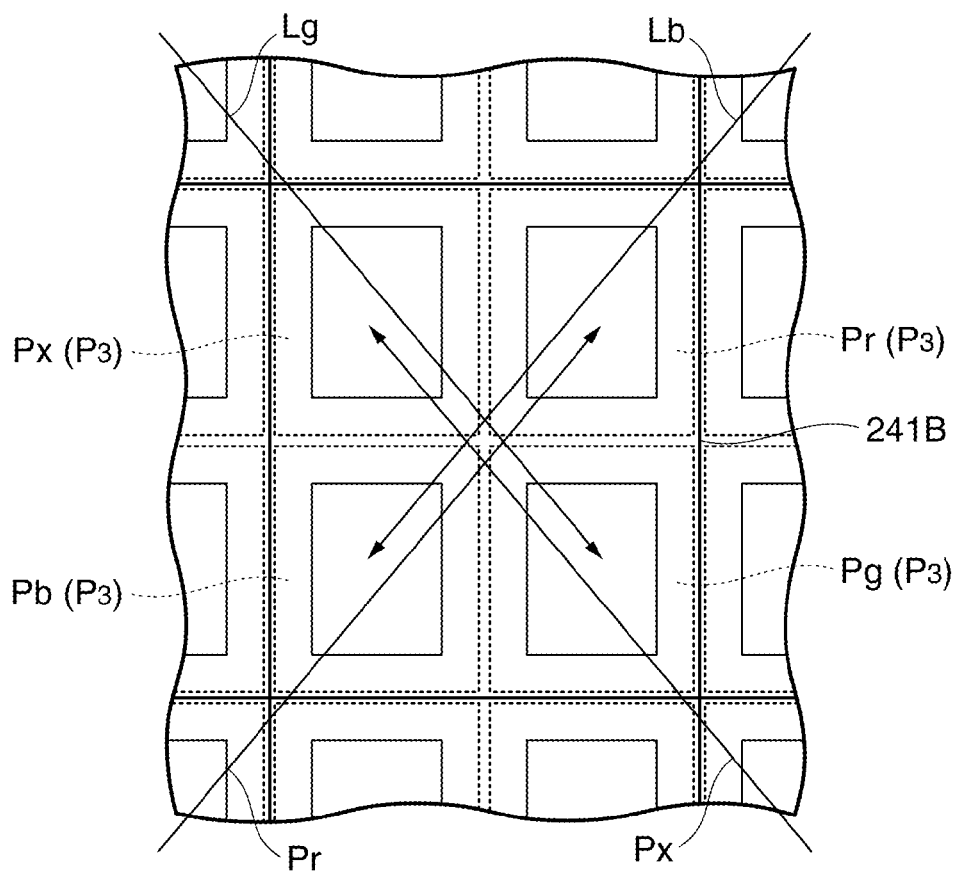
FIG. 9A is a diagram showing an incident light beam to the light modulation element.
Figure 9B:
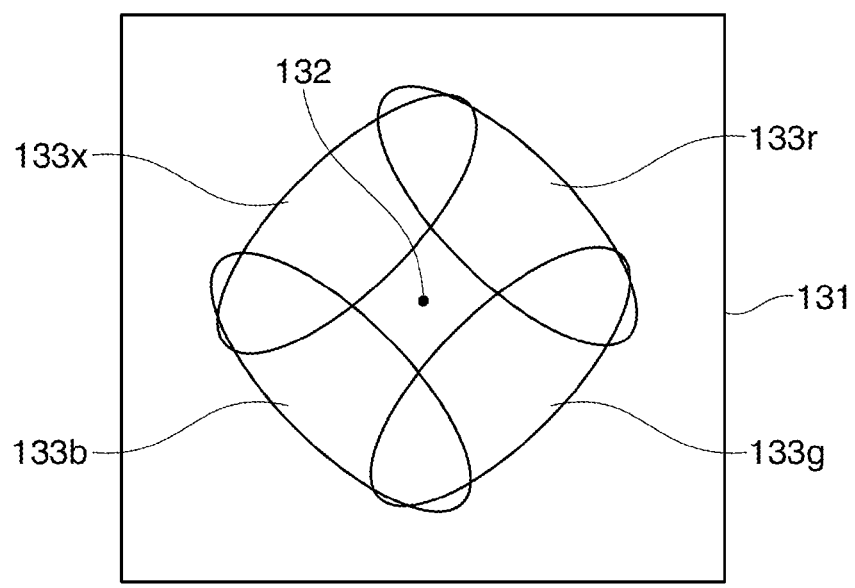
FIG. 9B is a diagram showing light distributions in a Fourier transform plane of a projection optical system.

FIG. 9A is a plan view showing an incident light beam to the lens array 24B and the light modulation element 22B when viewing the light entrance area 220B of the light modulation element 22B in a planar manner, and FIG. 9B is a conceptual diagram showing the distributions of the light beams in the Fourier transform plane of the projection optical system 13.

The light modulation element 22B has a plurality of pixels arranged two-dimensionally. As shown in FIG. 9B, one pixel $P_3$ is composed of the four subpixels Pr, Pb, Pg, and Px arranged in a 2×2 matrix. Each of the subpixels Pr, Pb, Pg, and Px is composed of one modulation element 221. In other words, each of the pixels $P_3$ is composed of the four modulation elements 221. The configuration of the modulation element 221 is substantially the same as that of the first embodiment.

When focusing attention to the light beams Lr, Lx from the first and fourth light sources 25r, 25x disposed at opposing corners in the matrix of the light sources, the light beam Lr proceeds in one diagonal direction of the pixels $P_3$ and enters the subpixel Pr, and the light beam Lx proceeds in the reverse direction from that of the light beam. Lr along the one diagonal direction and enters the subpixel Px. When focusing attention to the light beams Lg, Lb from the second and third light sources 25g, 25b disposed at opposing corners different from those of the first and fourth light sources 25r, 25x, the light beam Lg proceeds in the other diagonal direction of the pixels $P_3$ and enters the subpixel Pg, and the light beam Lb proceeds in the reverse direction from that of the light beam Lg along the other diagonal direction and enters the subpixel Pb.

The light beams Lr, Lg, Lb, and Lx are modulated and controlled in the respective subpixels Pr, Pg, Pb, and Px independently of each other in the liquid crystal layer, and then emitted from the light modulation element 22B. The proceeding direction of the principal ray of each of the light beams Lr, Lg, Lb, and Lx emitted from the light modulation element 22B is arranged to be nonparallel to the incident light axis out of the optical axes 130 of the projection optical system 13. As shown in FIG. 9B, in the Fourier transform plane 131 of the projection optical system 13, the spot 133r by the light beam Lr is distant from the position 132 of the optical axis 130 in the Fourier transform plane 131. Similarly, the spots 133g, 133b, and 133x by the light beams Lg, Lb, and Lx are also distant from the position 132.

In the projector 2B according to the second modified example, the proceeding directions of the light beams Lr, Lg, Lb, and Lx emitted from the light modulation element 22B are all arranged to be nonparallel to the optical axis 130 of the projection optical system 13. Therefore, since the spots 133r, 133g, 133b, and 133x are formed in the areas shifted from the position 132 of the optical axis 130 in the Fourier transform plane 131 of the projection optical system 13, and thus the high-frequency noise can effectively generated, the speckle noise can effectively be reduced. Further, the light beam the projection optical system 13 fails to cover can be reduced, and thus the degradation of the light efficiency can be prevented.

Further, since the plurality of light sources 25B is arranged two-dimensionally, the proceeding directions of the light beams Lr, Lg, Lb, and Lx can be adjusted in the two directions corresponding to the arranging directions of the light sources. Thus, it becomes easy to make the proceeding directions of the light beams Lr, Lg, Lb, and Lx when entering the light modulation element 22B different from each other.

Figure 10:
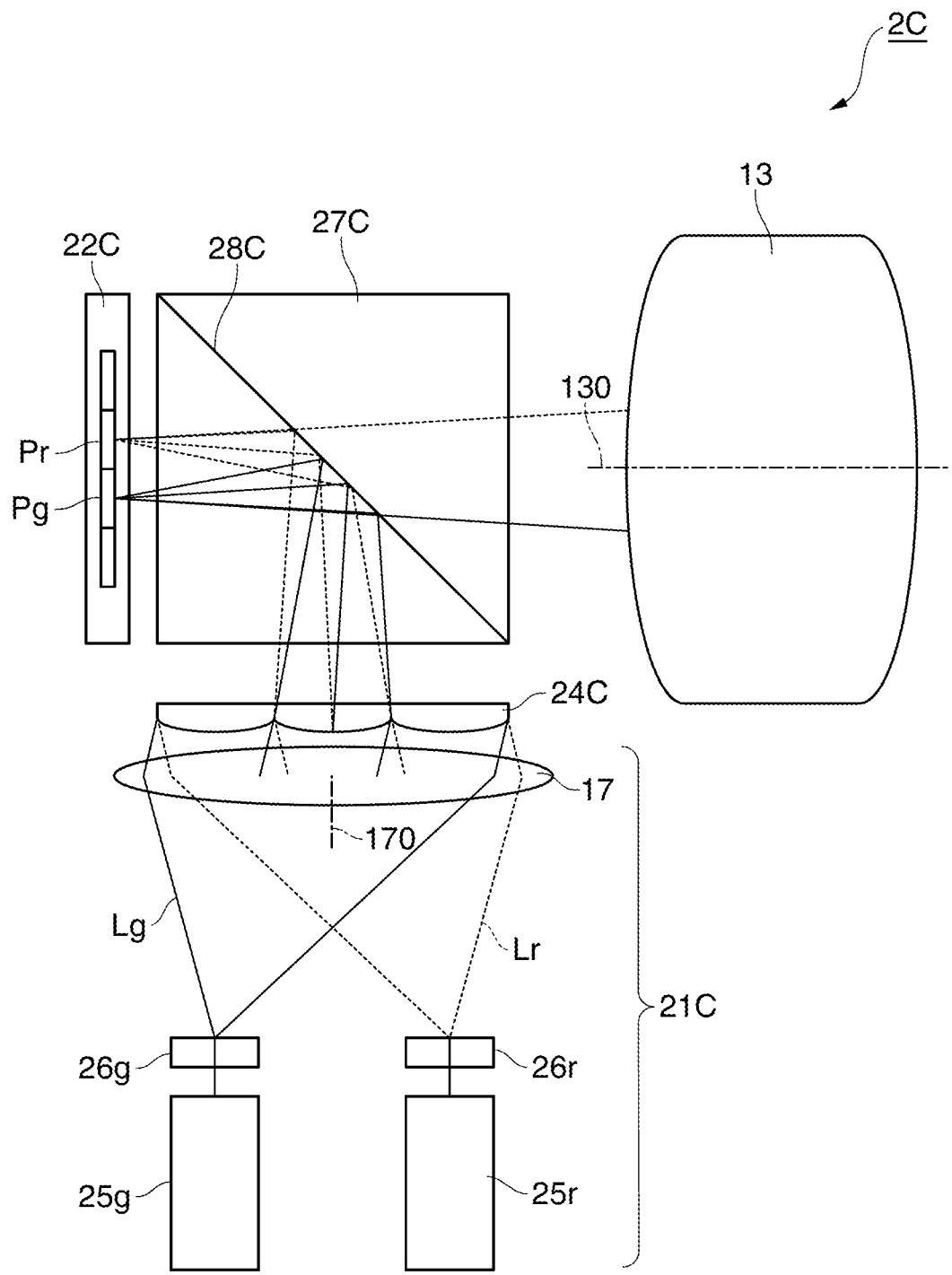
FIG. 10 is a schematic configuration diagram showing a projector according to a third modified example.

It should be noted that although the transmissive light modulation element is adopted in the first and second embodiments and first and second modified examples, it is also possible to adopt a reflective light modulation element as the case of a third modified example shown in FIG. 10. FIG. 10 is a diagram showing a schematic configuration of a projector 2C in the third modified example.

As shown in FIG. 10, the projector 2C is provided with an illumination system 21C, a light modulation element 22C, the projection optical system 13, a lens array 24C, and a polarization beam splitter prism (hereinafter referred to as a PBS prism) 27C. The illumination system 21C is substantially the same as that of the second modified example, and is provided with the first and second light sources 25r, 25g, the first and second diffusion sections 26r, 26g, and the collimating lens 17. The first and second light sources 25r, 25g are arranged to emit an S-polarized light beam with respect to a PBS film 28C described later.

The lens array 24C of the third modified example is independent of the light modulation element 22C, and is disposed at the position where the light beams Lr, Lg emitted from the illumination system 21C enter. The light beams Lr, Lg having passed through the lens array 24C enter the PBS prism 27C while converging. The PBS prism 27C contains a polarization beam splitter film (hereinafter referred to as a PBS film) 28C. Here, the PBS film 28C is disposed at an angle of about 45° with the optical axis of the collimating lens 17. In the light beams Lr, Lg having entered the PBS prism 27C, the S-polarized light beams with respect to the PBS film 28C are reflected by the PBS film 28C, and the proceeding directions are folded, and are emitted from the PBS prism 27C.

The light beams Lr, Lg emitted from the PBS prism 27C enter the light modulation element 22C. The light modulation element 22C is composed of a reflective liquid crystal light valve, a digital mirror device (DMD), or the like. The light modulation element 22C has a plurality of subpixels Pr, Pg arranged two-dimensionally. The light beams Lr, Lg enter the light modulation element 22C from a direction nonorthogonal to the plane along the two arranging directions of the subpixels Pr, Pg. The proceeding directions of the light beams Lr, Lg when entering the light modulation element 22C are different from each other. The light beams Lr, Lg are reflected by the light modulation element 22C while being modulated by the light modulation element 22C.

The light beams Lr, Lg are emitted from the light modulation element 22C, and are then input again to the PBS film 28C. In the light beams Lr, Lg, the P-polarized light beams with respect to the PBS film 28C are transmitted through the PBS film 28C, and proceed toward the projection optical system 13. When entering the projection optical system 13, the proceeding directions of the light beams Lr, Lg are nonparallel to the optical axis of the projection optical system 13. The light beams Lr, Lg are projected to the imaging surface by the projection optical system 13, and the image is displayed by the light beams Lr, Lg thus imaged. Also in the projector 2C according to the third modified example having the configuration described above, for the reason described above, the speckle noise can be reduced while preventing the degradation of the light efficiency even with a simplified configuration.

Third Embodiment

Then, a projector according to a third embodiment will be explained. The third embodiment is different from the second embodiment in that a plurality of illumination systems is provided, and the light modulation element is provided to each of the illumination systems, and thus a three-panel projector is provided.

Figure 11:
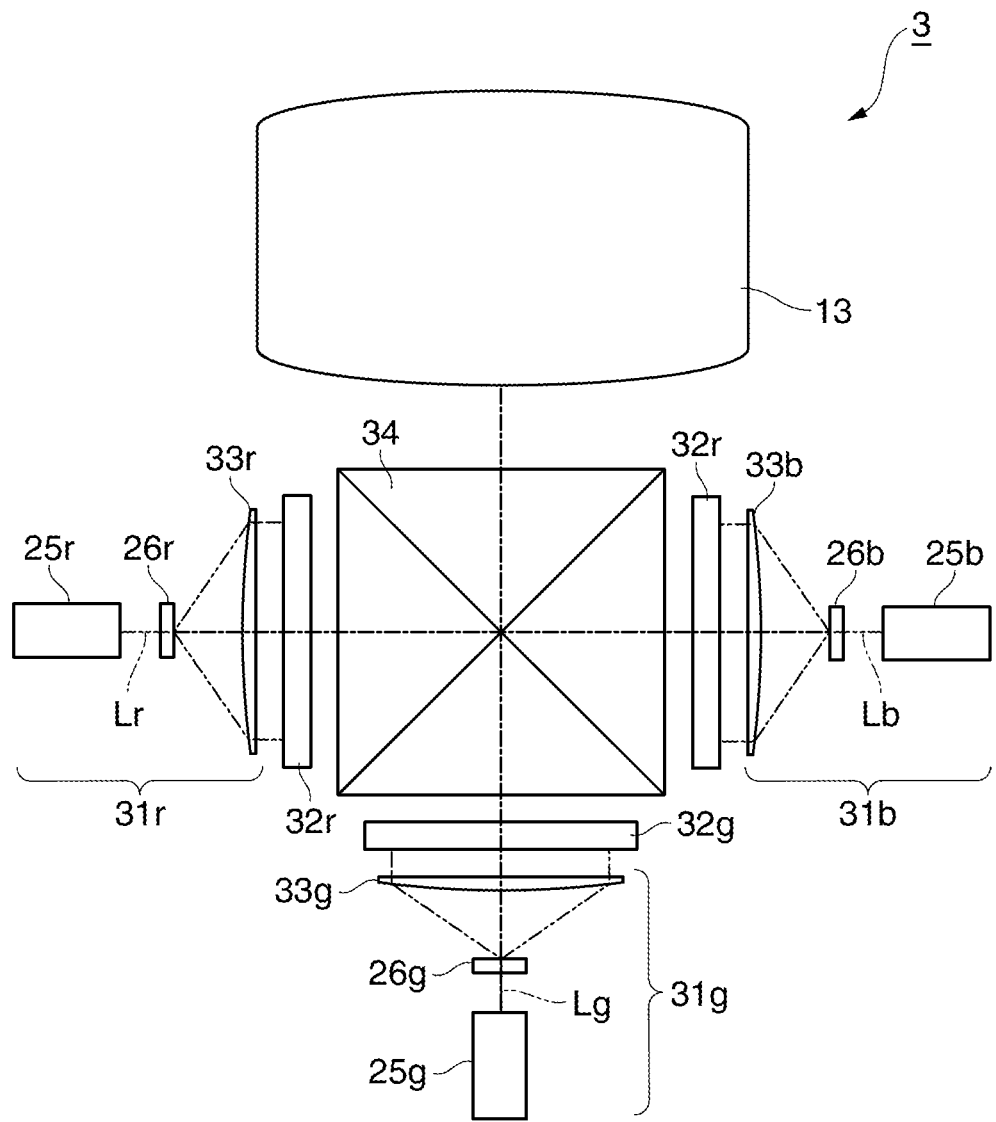
FIG. 11 is a configuration diagram showing a projector according to a third embodiment of the invention.
Figure 12A:
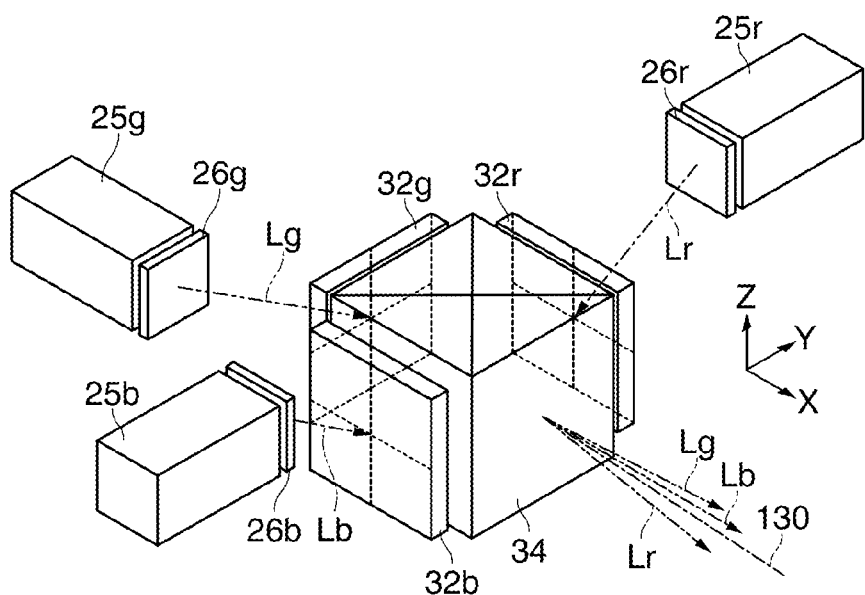
FIG. 12A is an arrangement diagram of a color combination element and an illumination system.
Figure 12B:
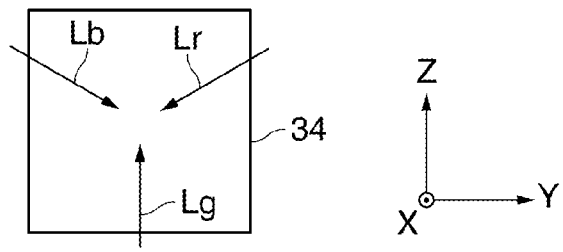
FIG. 12B is a plan view of a light beam entering the color combination element.
Figure 12C:
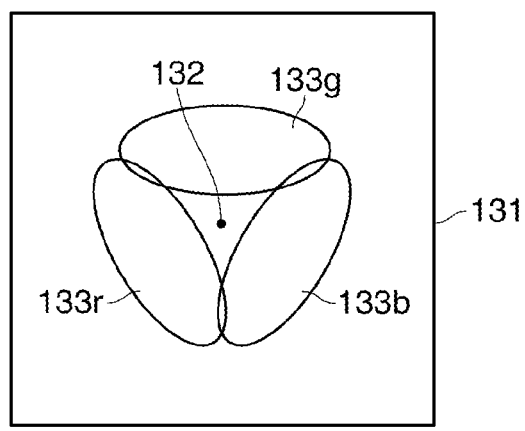
FIG. 12C is a diagram showing a light distribution in the Fourier transform plane of a projection optical system.

FIG. 11 is a schematic diagram showing a general configuration of the projector 3 according to the third embodiment, FIG. 12A is an arrangement diagram of a color combination element and an illumination system, FIG. 12B is a plan view of a light beam entering the color combination element viewed from the optical axis of the projection optical system 13, and FIG. 12C is a diagram showing a light distribution in the Fourier transform plane of the projection optical system. In FIG. 12B, the first through third collimating lenses 33r, 33g, and 33b are omitted from the illustration.

As shown in FIG. 11, the projector 3 is provided with first through third illumination systems 31r, 31g, and 31b, first through third light modulation elements 32r, 32g, and 32b, the color combination element 34, and the projection optical system 13. The first through third illumination systems 31r, 31g, and 31b each have the configuration substantially the same as the illumination system of the first embodiment, but the wavelengths of the light beams emitted by the first through third illumination systems are different from each other.

The first illumination system 31r has the first light source 25r, the first diffusion section 26r, and the first collimating lens 33r. The second illumination system 31g has the second light source 25g, the second diffusion section 26g, and the second collimating lens 33g. The third illumination system 31b has the third light source 25b, the third diffusion section 26b, and the third collimating lens 33b.

The color combination element 34 is composed of a dichroic prism or the like. The color combination element 34 of the present embodiment has a roughly rectangular solid shape, and contains two types of wavelength selection films for selectively reflecting or transmitting the input light beam in accordance with the difference in wavelength. The two types of the wavelength selection films are disposed in a diagonal direction of the color combination element 34 viewed from one direction (a Z direction) and intersect with each other. The first illumination system 31r and the first light modulation element 32r are disposed on a first side of the color combination element 34 viewed from the Z direction in a planar manner. The second illumination system 31g and the second light modulation element 32g are disposed on the second side of the color combination element 34 adjacent to the first side thereof. The third illumination system 31b and the third light modulation element 32b are disposed on the opposite side of the color combination element 34 to the first side thereof.

As shown in FIGS. 12A and 12B, the first and third illumination systems 31r, 31b are disposed at positions shifted in the positive Z direction from the respective positions of the normal line of the light entrance areas in the first and third light modulation elements 32r, 32b passing through the central positions of the light entrance areas. The second illumination system 31g is disposed at the position shifted in the negative Z direction from the position on the normal line of the light entrance area in the second light modulation element 32g passing through the central position of the light entrance area.

The light beam Lr emitted from the first illumination system 31r is reflected by the wavelength selection film of the color combination element 34, and thus the proceeding direction thereof is folded. Then, the light beam Lr is emitted from the opposite side (in an X direction) of the color combination element 34 to the side of the second illumination system 31g. The light beam Lg emitted from the second illumination system 31g is transmitted through the wavelength selection film of the color combination element 34, and is then emitted from the color combination element 34. The light beam Lb emitted from the third illumination system 31b is reflected by the wavelength selection film of the color combination element 34, and thus the proceeding direction thereof is folded.

Then, the light beam Lb is emitted from the opposite side of the color combination element 34 to the side of the second illumination system 31g.

In other words, the light beams Lr, Lg, and Lb respectively modulated by the first through third light modulation elements are emitted from one side of the color combination element 34 viewed from the Z direction in a planar manner via the color combination element 34. As described above, since the first through third illumination systems 31r, 31g, and 31b are disposed at the positions shifted in the positive or negative Z direction from the central positions of the light entrance areas of the first through third light modulation elements 32r, 32g, and 32b, the proceeding directions of the light beams Lr, Lg, and Lb emitted from the color combination element 34 are different from each other, and are nonparallel to the optical axis 130 of the projection optical system 13.

As shown in FIG. 12C, in the Fourier transform plane 131 of the projection optical system 13, the spot 133r by the light beam Lr is distant from the position 132 of the optical axis 130 in the Fourier transform plane 131. Similarly, the spots 133g and 133b by the light beams Lg, Lb are also distant from the position 132.

In the projector 3 according to the third embodiment, the proceeding directions of the light beams Lr, Lg, and Lb emitted from the color combination element 34 are all arranged to be nonparallel to the optical axis 130 of the projection optical system 13. Therefore, the high-frequency noise can effectively be generated, and thus the speckle noise can effectively be reduced. Further, the light beam the projection optical system 13 fails to cover can be reduced, and thus the degradation of the light efficiency can be prevented.

It should be noted that the scope of the invention is not limited to the embodiments described above. Various modifications are possible within the scope or the spirit of the invention.

The entire disclosure of Japanese Patent Application No. 2009-283963, filed Dec. 15, 2009 is expressly incorporated by reference herein.

What is claimed is:

1. An image display device comprising:
a plurality of illumination systems each adapted to emit a light beam, the light beams emitted from the plurality of illumination systems having wavelengths different from each other;
a plurality of light modulation elements provided so as to correspond one-to-one to the plurality of illumination systems and each being adapted to modulate the light beams emitted from each of the illumination systems;
a projection optical system adapted to project the light beam modulated by the light modulation element; and
a color combination element disposed on a light path between the plurality of the light modulation elements and the projection optical element, and adapted to combine light beams emitted from the plurality of light modulation elements,
wherein a proceeding direction of a principal ray of the light beam modulated by the light modulation element is nonparallel to an optical axis of the projection optical system when the light beam modulated by the light modulation element enters the projection optical system, and
wherein at least one of the plurality of illumination systems is disposed at a position shifted in a direction which is perpendicular to an imaginary plane, the imaginary plane being a plane on which central positions of light entrance areas of the first through third light modulation elements lie,
wherein in a Fourier transform plane of the projection optical system a spot formed from the light beam projected by the projection optical system is positioned away from the optical axis of the projection optical system.

2. The image display device according to claim 1, wherein a proceeding direction of the light beams emitted from the illumination systems is nonorthogonal to an arranging direction of a plurality of pixels of the light modulation elements when the light beams emitted from the illumination systems enter the light modulation elements as a plurality of an incident light beams.

3. The image display device according to claim 2, further comprising:
a lens array adapted to converge the light beams emitted from the illumination systems to the plurality of pixels of the light modulation elements.

4. The image display device according to claim 1, wherein the illumination system includes
a first diffusion section adapted to diffuse the light beam emitted from the first light source,
a second diffusion section adapted to diffuse the light beam emitted from the second light source, and
a plurality of collimating lenses adapted to collimate a light beam diffused by the first diffusion section and to collimate a light beam diffused by the second diffusion section, and
the light beam diffused by the first diffusion section and the light beam diffused by the second diffusion section enter the light modulation element at incident angles different from each other as the incident light beam via the plurality of collimating lenses.

5. The image display device according to claim 3, wherein the lens array has a plurality of lens elements,
one of the plurality of lens elements is disposed corresponding one-to-one to the one of the plurality of pixels of the light modulation element, and
a central position of the one of the plurality of lens elements corresponding to the one of the plurality of pixels is shifted toward an opposite direction to the proceeding direction of the light beam entering the one of the plurality of lens elements, in a condition of viewing the plurality of pixels in a planar manner, from a central position of one of the plurality of modulation elements constituting the one of the plurality of pixels.

6. An image display device comprising:
a plurality of illumination systems each adapted to emit a light beam, the light beams emitted from the plurality of illumination systems having wavelengths different from each other;
a plurality of light modulation elements provided so as to correspond one-to-one to the plurality of illumination systems and each being adapted to modulate the light beams emitted from each of the illumination systems;
a projection optical system adapted to project the light beam modulated by the light modulation element; and
a color combination element disposed on a light path between the plurality of the light modulation elements and the projection optical element, and adapted to combine light beams emitted from the plurality of light modulation elements,
wherein a proceeding direction of a principal ray of the light beam modulated by the light modulation element is nonparallel to an optical axis of the projection optical system when the light beam modulated by the light modulation element enters the projection optical system, and wherein in a Fourier transform plane of the projection optical system a spot formed from the light beam projected by the projection optical system is positioned away from the optical axis of the projection optical system.

* * * * *